(12) United States Patent
Giles et al.

(10) Patent No.: US 6,836,381 B2
(45) Date of Patent: Dec. 28, 2004

(54) OPTICAL CROSS CONNECT EMPLOYING A CURVED OPTICAL COMPONENT

(75) Inventors: Randy Clinton Giles, Whippany, NJ (US); David Thomas Neilson, Old Bridge, NJ (US)

(73) Assignees: Lucent Technologies Inc., Murray Hill, NJ (US); Agere Systems Inc.., Allentown, PA (US)

(*) Notice: Subject to any disclaimer, the term of this patent is extended or adjusted under 35 U.S.C. 154(b) by 0 days.

(21) Appl. No.: 10/620,990

(22) Filed: Jul. 16, 2003

(65) Prior Publication Data

US 2004/0085656 A1 May 6, 2004

Related U.S. Application Data

(62) Division of application No. 09/641,122, filed on Aug. 16, 2000, now abandoned.
(60) Provisional application No. 60/168,282, filed on Dec. 1, 1999.

(51) Int. Cl.[7] .......................... G02B 5/08; G02B 17/00; G02B 6/26
(52) U.S. Cl. ...................... 359/727; 359/730; 359/857; 359/861; 385/18
(58) Field of Search ........................... 398/56; 359/727, 359/730, 731, 849, 857, 858, 861; 385/15, 16, 17, 18

(56) References Cited

U.S. PATENT DOCUMENTS

| | | | |
|---|---|---|---|
| 5,745,309 A | * | 4/1998 | Salmon |
| 5,974,207 A | | 10/1999 | Aksyuk et al. |
| 6,097,859 A | | 8/2000 | Solgaard et al. |
| 6,188,814 B1 | | 2/2001 | Bhalla |
| 6,222,954 B1 | * | 4/2001 | Riza |
| 6,263,123 B1 | | 7/2001 | Bishop et al. |
| 6,268,952 B1 | | 7/2001 | Godil et al. |
| 6,310,713 B2 | * | 10/2001 | Doany et al. |
| 6,313,936 B1 | | 11/2001 | Holmes |
| 6,337,935 B1 | | 1/2002 | Ford et al. |
| 6,411,751 B1 | | 6/2002 | Giles et al. |
| 6,442,307 B1 | | 8/2002 | Carr et al. |
| 6,466,711 B1 | | 10/2002 | Laor et al. |
| 6,487,334 B2 | | 11/2002 | Ducellier et al. |

* cited by examiner

Primary Examiner—Ricky D. Shafer

(57) ABSTRACT

An optical device for routing a plurality of optical signals between a first port and a second port is disclosed. The optical device includes a mirror array having a plurality of reflective elements. Each optical input signal is directed by a reflective element in a direction designated by a control signal. The optical device further includes a curved mirror for receiving each directed optical signal from the respective reflective element, and for reflecting each directed optical signal to the first or second port.

14 Claims, 4 Drawing Sheets

OPTICAL CROSS CONNECT EMPLOYING A CURVED OPTICAL COMPONENT

This application is a divisional of application Ser. No. 09/641,122 filed Aug. 16, 2000, now abandoned currently pending to Randy C. Giles, et al. The above-listed application Ser. No. 09/641,122 is commonly assigned with the present invention and is incorporated herein by reference in its entirety.

PRIORITY APPLICATION

This application claims priority from a provisional U.S. patent application, Ser. No. 60/168,282, filed on Dec. 1, 1999, hereby incorporated by reference.

FIELD OF THE INVENTION

The present invention relates to mirror arrays, generally, and more particularly to signal routers.

BACKGROUND OF THE INVENTION

Signal routing is an essential component in network design. Signal routing involves directing signals from one location to another. Traditionally, signal routing has employed semiconductor switching devices. However, with the commercial drive for faster and more responsive networks offering greater bandwidth, semiconductor switching devices have been identified as a bottleneck. As a result of the switching speed limitations of semiconductor devices, industry is developing networks that rely on a greater number of electro-optical components, including optically based signal routing devices.

One class of electro-optical components proposed for signal routers is micro-electromechancial system (MEMS) based mirror arrays. For more information on MEMS based mirror arrays, their operation and fabrication, see Aksyuk et al., U.S. Pat. No. 5,912,094, Aksyuk et al., U.S. Pat. No. 5,994,159, and Aksyuk et al., U.S. Pat. No. 5,995,688, all of which are commonly assigned with the present invention and hereby incorporated by reference. Principally, one or more mirror in a MEMS based mirror array is operatively controlled by an electrostatic force initiated by an associated series of control signals. In response to a series of control signals, the one or more mirror of the array is tilted to a specific coordinate around a pair of axes. The tilting mechanism, and details of its operation with respect to a MEMS mirror array are found in U.S. patent application Ser. No. 09/415,178, filed on Oct. 8, 1999, commonly assigned with the present invention and hereby incorporated by reference.

Referring to FIG. 1, a top view of a MEMS based mirror array 10 for reflecting optical signals is illustrated. Array 10 is a two by two matrix of mirrors 15 formed on a common substrate 20. One or more mirrors 15 of array 10 tilts around a first and/or a second axis, 25 and 30, in response to the series of control signals. An incoming optical signal, therefore, may be reflected in a direction specified by the tilt of a respective mirror 15 of array 10 as determined by the received series control signals. The ability of the mirror 15 to direct the reflected incoming optical signal enables array 10 to be employed within an optical signal router.

Additional considerations are required to design an optical signal router employing a MEMS based mirror array. One or more mirror is tiltable within a steering range to route the optical signals. The degree to which the one or more mirror may tilt within its steering range corresponds with the voltages of the series of respective control signals. These control signals may reach as high as 150V to enable a mirror to tilt within its entire steering range. Further, the mirrors of the MEMS based mirror array are positioned in close proximity to one another—approximately 1 mm. Therefore, with the possibility of high potential voltages and the close spacing between mirrors, unwanted particles introduced during manufacturing or packaging of the MEMS based mirror arrays may facilitate arcing between conductive elements of adjacent mirrors.

As a result of these limitations, a demand exists for a MEMS based mirror array wherein each mirror requires a smaller range than its steering range to route optical signals. A need also exists for a MEMS based mirror array wherein each mirror requires controls signals lower than 150V for positioning each mirror to route optical signals.

SUMMARY OF THE INVENTION

An optical device is disclosed for directing optical signals between a plurality of first ports and a plurality of second ports. The optical device has at least one array of mirrors, such as, for example, a MEMS based mirror array. One or more mirrors in the array may be tilted around a first and/or a second axis in response to a series of control signal. The full extent of the tilt of the mirrors of the MEMS based mirror array is referred to herein as a steering range. By controlling the tilt of each mirror, an optical signal may be routed from one port of the first plurality to another port of the second plurality. For the purposes of the present invention, the optical signals are collimated Gaussian beams. In one embodiment, the optical signals having a wavelength of 1550 nm.

The optical device includes at least one curved reflective component. The curved reflective component enables one or more mirrors of the MEMS based mirror array to route an optical signal from any port of the plurality of first ports to any port of the plurality of second ports. The curvature of the reflective component may be at least one of spherical, parabolic or conic. An exemplary reflective component 80 is shown in FIG. 3. By designing reflective component 80 with a spherical concave curvature, the distance separating component 80 and a mirror array 75, may be extended by a displacement distance, Z, beyond the Rayleigh range, $Z_R$, without scattering the optical signals. For the purposes of the present disclosure, a Rayleigh range, $Z_R$, is the approximate distance from the narrowest point of a Gaussian optical beam, or waist, to where the diameter of the beam expands by the square root of two. In one embodiment, the Rayleigh range, $Z_R$, is approximately 50 mm, the displacement distance, Z, is approximately 20.7 mm, and radius of curvature of reflective component 80 is approximately 141.5 mm.

The curvature of exemplary reflective component 80 enables the reflection of an optical signal back to an exemplary mirror on mirror array 75 from the extended distance created by displacement distance, Z. At the extended distance, the optical beam passes through its waist and begins to diverge. The reflection of the optical signal, as received by array 75, however is not scattered. The optical signal does not scatter because of the curvature of diverging optical signal matches the curvature of the reflective component 80. In extending the separation beyond the Rayleigh range without scattering the optical signal, each mirror in array 75 requires less than the steering range for routing an optical signal with reflective component 80. The range required in one embodiment of the present invention is approximately 7.5 degrees, in comparison with a planar reflective component 65 of FIG. 2(*a*) having a steering range of approximately 10.4 degrees.

These and other advantages and objects will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific parameters or the structural details of the invention, which can be determined by one skilled in the art by examination of the information herein.

DETAILED DESCRIPTION OF THE PRESENT INVENTION

Figure 2A:
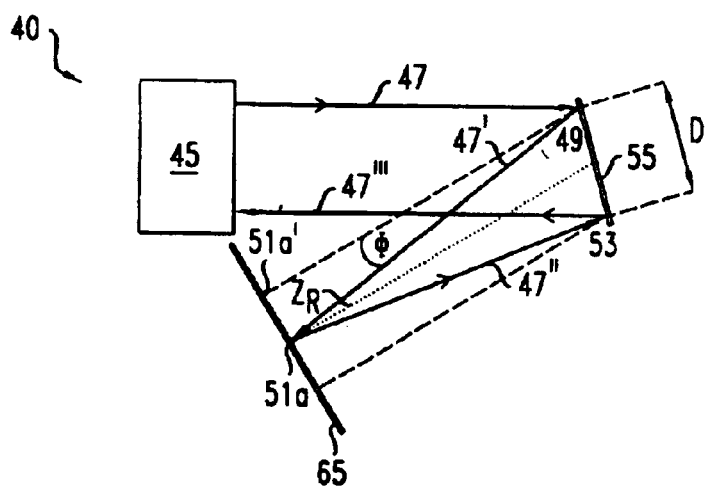
FIG. 2(*a*) is a cross-sectional view of an optical switching device employing a MEMS based mirror array, while FIG. 2(*b*) is a cross-sectional view of an exemplary mirror of the MEMS based mirror array of FIG. 2(*a*)
Figure 2B:
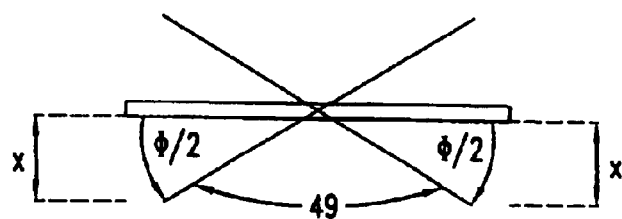

Referring to FIGS. 2(*a*), a cross sectional view of an optical device 40 employing a fixed plane mirror is illustrated. Optical switching device 40 receives a plurality of optical signals from a first portion of an input/output port, 45, and redirects them back to a second portion of input/output port, 45. At least one optical signal of the plurality may be routed using an array of mirrors 55 in combination with a fixed planar mirror 65. Input/output port, 45, is spaced from mirror array 55 by a Rayleigh range, $Z_R$. Likewise, mirror array 55 and plane mirror 65 are spaced apart by a Rayleigh range, $Z_R$. The optical signals have a Gaussian distribution, and upon emanating from port 45 having a width of approximately 0.5 mm and wavelength of approximately 1550 nm, such that the Rayleigh range, $Z_R$, is approximately 50 mm. The separation by a Rayleigh range, $Z_R$, enables optical signals emanating from array 55 to reach mirror 65, and vice versa, at their waist, thereby averting scattering.

Figure 1:
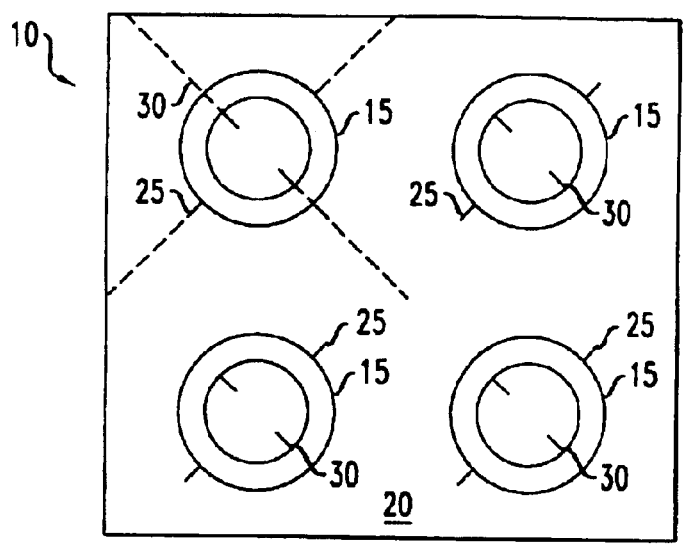
FIG. 1 is a top view of a micro-electromechancial system ("MEMS") based mirror array.

As detailed in FIG. 1 and the accompanying text herein, one or more mirrors in array 55 may be positioned to a specific coordinate around a pair of axes. The position, or tilt, of each mirror in array 55 establishes the direction to which an incoming optical signal may be reflected. The full extent to which each mirror may tilt is referred to as a steering range, $\Phi$. Steering range, $\Phi$, may be mathematically expressed by the following equation:

$$\Phi \cong \tan^{-1}\frac{D}{2 \times Z_R}$$

where D is the width of mirror array 55. It should be apparent to skilled artisans that the steering range for each mirror of array 55 is inversely proportional with the distance, $Z_R$. As such, the greater the distance, $Z_R$, the smaller the steering range required. In one realization of device 40, the steering range, $\Phi$, is approximately 10.4 degrees, and the width, D, is approximately 18.4 mm.

The specific coordinates in positioning each mirror within its steering range, $\Phi$, correspond with a received series of control signals. It should also be apparent to skilled artisans from the present disclosure that with the addition of supportive electronics, such as a buffer, for example, one signal may control the specific coordinates and positioning of each the mirror of the array. As such, for the purposes of the present disclosure, a control signal may be used interchangeably with a series of control signals.

The following is a representation of the interaction between mirror array 55 and plane mirror 65 in routing an optical signal 47 from the first portion of input/output port, 45, to the second portion of input/output port, 45, via optical signal 47'''. Upon receiving a control signal, a first exemplary mirror 49 in array 55 is positioned to receive and reflect optical signal 47. First exemplary mirror 49 directs optical signal 47' onto plane mirror 65. Optical signal 47' is directed within a range of locations, 51*a* to 51*a'*, on plane mirror 65. Mirror 65 receives the directed optical signal 47' from exemplary mirror 49 at an incident angle with respect to a normal to a surface of plane mirror 65. Employing the law of reflection, an optical signal 47" is reflected off plane mirror 65 at an angle equal to angle of incidence. For more information on the law of reflection, as well as geometrical optics, see O'hea, "Elements of Modem Optical Design," Wiley & Sons 1985 (hereinafter "O'hea"), hereby incorporated by reference. Optical signal 47", as reflected by plane mirror 65, is directed back towards a location on array 55. In the present example, location 51*a* on plane mirror 65 causes the optical signal 47" to be directed towards a second exemplary mirror 53. Second exemplary mirror 53 is positioned, in response to a control signal, to receive and reflect optical signal 47". Upon receipt of optical signal 47", second exemplary mirror 53 reflects an optical signal 47''' into the second portion of the input/output port, 45. Thus, by positioning first and second exemplary mirrors, 49 and 53, of array 55, the routing of optical signal 47 from the first portion of the input/output port 45 to the second portion of the input/output port 45 by optical signal 47''' is thereby complete. It should be apparent to skilled artisans, in view of FIG. 2 and the accompanying text, that a plurality of optical signals may be routed using the multitude of mirrors on mirror array 55 in combination with plane mirror 65.

Referring to FIG. 2(*b*), is a cross-sectional view depicting the steering range, $\Phi$, of exemplary mirror 49 is illustrated. To reflect an optical signal to location 51*a* on plane mirror 65, exemplary mirror 49 tilts counter clockwise by an angle of $\Phi/2$. Similarly, for exemplary mirror 49 to reflect an incoming optical signal to location 51*a'* on plane mirror 65, mirror 49 tilts clockwise by an angle of $\Phi/2$. Thus, the steering range for exemplary mirror 49 is the sum of $\Phi/2$ and $\Phi/2$, or $\Phi$.

It should be also noted that by tilting clockwise to an angle of Φ/2, mirror 49 is displaced from its neutral position by a distance x. Likewise, mirror 49 is also displaced from its neutral position by a distance x when tilted counterclockwise to an angle of Φ/2. As stated hereinabove, mirror 49 tilts in response to a voltage from a received control signal. The distance traveled, x, by mirror 49 corresponds with the voltage of the received control signal. Hence, a voltage of 150V from a received control signal may be required to cause mirror 49 to travel the distance x. For a steering range, Φ, of approximately 10.4 degrees, the distance, x, which mirror 49 travels is approximately 22.8 $\mu$m.

Figure 3A:
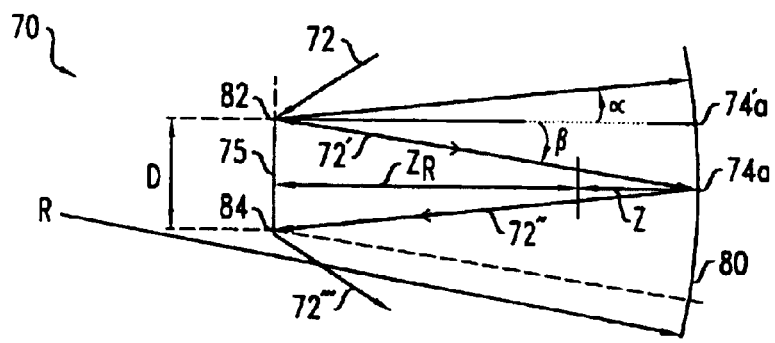
FIG. 3(*a*) is a cross-sectional view of an optical switching device employing the principles of the present invention, while FIG. 3(*b*) is a cross-sectional view of an exemplary element of the optical switching device of FIG. 3(*a*)
Figure 3B:
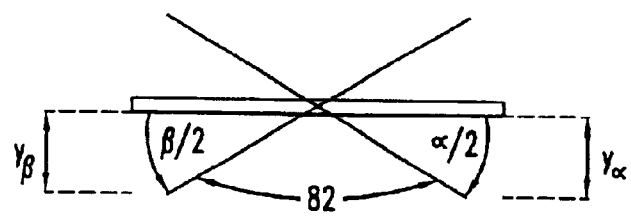

Referring to FIGS. 3(a) and 3(b), a cross-sectional view of an optical switching device 70 employing the principles of the present invention is illustrated. Optical switching device 70 includes an array of mirrors 75 and a curved concave reflective component 80. In one embodiment, reflective component 80 is a spherically shaped mirror having a radius of curvature. In the alternative, a parabolic or conic shaped mirror may also be employed as curved reflective component 80.

Mirror array 75 is spaced from curved reflective component 80 by an extended distance than the Rayleigh range, $Z_R$, in comparison with optical device 40 of FIG. 2(a). Array 75 and reflective component 80 are separated by a distance equal to the sum of the Rayleigh range, $Z_R$, and a displacement distance, Z. The increased separation between array 75 and reflective component 80 does not scatter optical signals being reflected between the mirrors of array 75 and reflective component 80. The optical signals do not scatter because of the curvature of diverging optical signal is equal to a curvature of reflective component 80. Therefore, the radius of curvature of reflective component 80 corresponds with displacement distance, Z, and the Rayleigh range, $Z_R$, and this relationship may be expressed by the following mathematical equation:

$$R = Z + \frac{Z_R^2}{Z}$$

where R is the radius of curvature. It should be apparent to skilled artisans from this mathematical expression that the displacement distance, Z, created by curved reflective component 80 increases as the radius, R, increases, for a given Rayleigh range, $Z_R$. In one embodiment of the present invention, the optical signals emanate from a source having a width of approximately 0.5 mm such that the Rayleigh range, $Z_R$, is approximately 50 mm, the displacement distance, Z, is approximately 20.7 mm, and the radius of curvature, R, is approximately 141.5 mm.

Each mirror in array 75 requires a smaller range than the steering range, Φ, of each mirror of array 55 of FIG. 2(a). The range of each mirror in array 75 is smaller as a result of the additional spacing between array 75 and curved reflective component 80 caused by displacement distance Z. The range of each mirror in array 75 is equal to the sum of half of an incoming angle, β, and half of an outgoing angle, α. It should be apparent to skilled artisans, from laws of reflection and geometric optics, that to reflect or redirect an optical signal within an angular range, a mirror need tilt half the angle of the desired angular range. See O'Shea. As shown in FIG. 3(b), the range of each mirror in array 75 is equal to the sum of the tilt required for each mirror to receive an incoming optical signal, β/2, and the tilt required for each mirror to direct an outgoing optical signal, α/2.

Incoming angle, β is the angle for which each mirror in array 75 is required for an optical signal to be directed from one end of array 75 to the other end of array 75. For the purposes of illustration, incoming angle, β, allows an optical signal to be directed from a first exemplary mirror 82 to a second exemplary mirror 84. Incoming angle, β, may be mathematically expressed by the following equation:

$$\beta = \tan^{-1}\left(\frac{D}{2Z_R \times 2Z}\right)$$

where D is the width of array 75. From the above mathematical equation, incoming angle, β, is inversely proportional to displacement distance, Z, such that as displacement distance, Z, increases, incoming angle, β, decreases, and vice versa. In one embodiment of the present invention, the width, D, of array 75 is approximately 18.4 mm, and the incoming angle, β, is approximately 3.75 degrees.

Outgoing angle, α, is the angle required for each mirror in array 75 to be positioned to receive an outgoing optical signal from curved reflective component 80. Outgoing angle, α, may be expressed by the following mathematical equation:

$$\alpha = \tan^{-1}\left(\frac{D*Z}{2Z_R^2 - Z_R*Z}\right)$$

wherein outgoing angle, α, is formed by the existence of displacement distance. It should be apparent to skilled artisans that that outgoing angle, α, is directly proportional to displacement distance, Z, such that as displacement distance, Z, increases, reflective angular deviation, α, increases, and vice versa. In one embodiment of the present invention, the width, D, of array 75 is approximately 18.4 mm, and the outgoing angle, α, is approximately 3.75 degrees.

It should be also noted that by tilting clockwise to an angle of α/2, first exemplary mirror 82 is displaced from its neutral position by a distance $y_{60}$. Mirror 82 is also displaced from its neutral position by a distance $y_\beta$ when tilted counterclockwise to an angle of β/2. As stated hereinabove, mirror 82 tilts in response to a voltage from a received control signal. The distances traveled, $y_\alpha$ or $y_\beta$, by mirror 82 each correspond with the voltage of the received control signal. Hence, a voltage of approximately 130V from a received control signal may be required to cause mirror 82 to travel the distance $y_\alpha$ or $y_\beta$. In one embodiment, incoming angle, β, and outgoing angle, α, are both equal to approximately 3.75 degrees, and the distances, $Y_\alpha$ and yβ, are both equal to approximately 16.4 $\mu$m.

The following is a representation of the interaction between mirror array 75 and curved reflective component 80 in routing an incoming optical signal 72 through optical switching device 70 via outgoing optical signal 72'''. Upon receiving a control signal, a first exemplary mirror 82 in array 75 is positioned to receive and reflect an incoming optical signal 72. First exemplary mirror 82 directs optical signal 72' onto curved reflective component 80. Optical signal 72' is directed by exemplary mirror 82 within a range of locations, 74a to 74a', on curved reflective component 80. Curved reflective component 80 receives the directed optical signal 72' from exemplary mirror 82 at an incident angle with respect to a normal to a surface of curved reflective component 80. Employing the law of reflection, an optical signal 72'' is reflected off curved reflective component 80 at an angle equal to angle of incidence. Optical signal 72'' is directed back towards a location on array 75. In the present example, location 74a on curved reflective component 80 causes the optical signal 72" to be directed towards a second exemplary mirror 84. Second exemplary mirror 84 is positioned, in response to a control signal, to receive and reflect optical signal 72". Upon receiving reflect optical signal 72", second exemplary mirror 79 reflects an optical signal 72'". Thus, by positioning both first and second exemplary mirrors, 82 and 84, of array 75, optical switching device 70 routes incoming optical signal 72 to outgoing optical signal 72'". It should be apparent to skilled artisans in view disclosure herein that a plurality of optical signals may be routed using a multitude of mirrors on mirror array 75 and curved reflective component 80.

Figure 4:
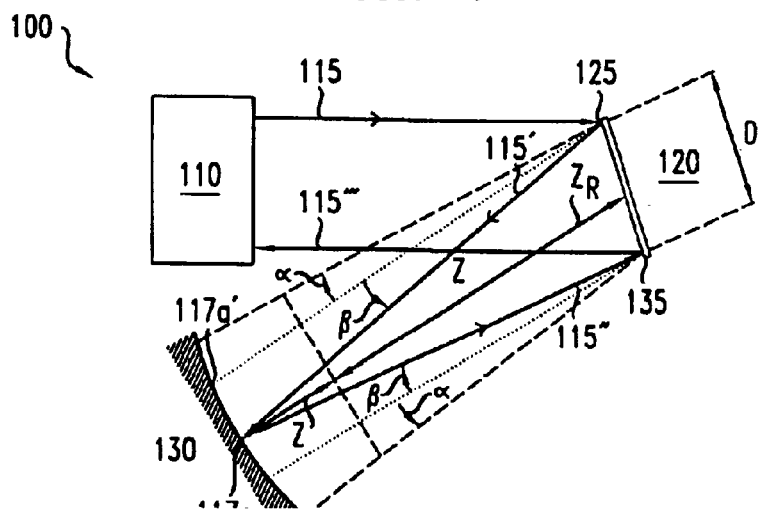
FIG. 4 is a cross-sectional view of an embodiment of the present invention.
Figure 5A:
FIGS. 5(*a*), 5(*b*), 5(*c*) and 5(*d*) are a cross-sectional view of a further embodiment of the present invention.
Figure 5B:
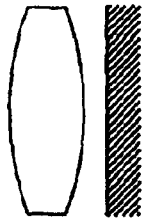
Figure 5C:
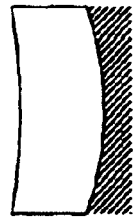
Figure 5D:
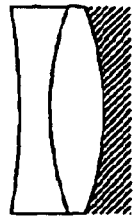

Referring to FIG. 4, a cross sectional view of an optical device 100 for routing optical signals is illustrated employing the principles of optical device 70 of FIGS. 3($a$) and 3($b$). Optical device 100 routes a plurality of optical signals from a first portion of an input/output port 110 to a section portion of input/output port 110. In the present configuration, the first and second portions of input/output port 110 are configured within a singular housing. It should be apparent to skilled artisans from the disclosure hereinbelow, however, that the alternate configurations may also be employed.

Each optical signal of the plurality of optical signals is routed using an array of mirrors 120 in combination with a curved concave reflective component 130. Mirror array 120 is spaced from port 110 by a Rayleigh range. Mirror array 120 has a matrix of reflective elements. In one embodiment, the matrix of reflective elements is realized by a MEMS based mirror array. Each mirror of array 120 tilts to a position in response to a control signal. Once an exemplary mirror of array 120 is tilted to a specific position, the exemplary mirror may direct an incoming optical signal, using the law of reflection, to a particular location on curved reflective component 130. For the purposes of illustration, mirror array 120 includes a first and a second exemplary mirror, 125 and 135, respectively.

Reflective component 130 has a curved concave shape. The curvature of reflective component 130 enables an increase in the spacing between array 120 and component 130 to the sum of the Rayleigh range, $Z_R$, and a displacement distance, Z, without scattering the optical energy being reflected between the mirrors of array 120 and component 130. The optical signal does not scatter because of the curvature of diverging optical signals matches the curvature of component 130. The Rayleigh range, $Z_R$, displacement distance, Z, and radius of curvature, R, mathematically correlate to one another, as expressed in the mathematical equations detailed hereinabove. In one embodiment of the present invention, curved reflective component 130 is a spherically shaped mirror. Various alternatives, however, will become apparent to skilled artisans upon reviewing the present disclosure.

The following is a representation of the interaction between mirror array 120 and curved reflective component 130 in routing an incoming optical signal 115 from a first portion of input/output port 110 to a second portion of input/output port 110. Upon receiving a control signal, a first exemplary mirror 125 in array 120 is positioned to receive and reflect incoming optical signal 115. First exemplary mirror 125 directs optical signal 115' onto curved reflective component 130. Optical signal 115' is directed by exemplary mirror 125 within a range of locations, 117$a$ to 117$a$', on curved reflective component 130. Curved reflective component 130 receives the directed optical signal 115' from exemplary mirror 125 at an incident angle with respect to a normal to a surface of curved reflective component 130.

Employing the law of reflection, an optical signal 115" is reflected off curved reflective component 130 at an angle equal to angle of incidence. Optical signal 115" is directed back towards a location on array 120. In the present example, location 117$a$ on curved reflective component 130 causes the optical signal 115" to be directed towards a second exemplary mirror 135. Second exemplary mirror 135 is positioned, in response to a control signal, to receive and reflect optical signal 115". Upon receiving optical signal 115", second exemplary mirror 135 reflects an optical signal 115'". Thus, by positioning both first and second exemplary mirrors, 125 and 135, of array 120, optical switching device 100 routes incoming optical signal 115 from a first portion of input/output port 110 to a second portion of input/output port 110. It should be apparent to skilled artisans in view disclosure herein that a plurality of optical signals may be routed using a multitude of mirrors on mirror array 120 and curved reflective component 130.

Each mirror in array 120, including exemplary mirrors 125 and 135, requires a smaller range than the steering range, Φ, of each mirror of array 55 of FIG. 2($a$). The range of each mirror in array 120 is smaller as a result of the additional spacing between array 120 and curved reflective component 130 caused by displacement distance Z. The range of each mirror in array 120 is equal to the sum of the tilt required for each mirror to receive an incoming optical signal, β/2, and the tilt required for each mirror to direct an outgoing optical signal, α/2. By tilting clockwise to an angle of α/2 and counterclockwise to an angle of β/2, each mirror on array 120 travels from its neutral position by a particular travel distance.

In one embodiment of the present invention, the optical signals emanate from port 110 having a width of approximately 0.5 mm and wavelength of approximately 1550 nm, such that the Rayleigh range, $Z_R$, a Rayleigh range, $Z_R$, of approximately 50 mm, a displacement distance, Z, of approximately 20.7 mm, curved reflective component 130 has a radius of curvature, R, of approximately 141.5 mm, a width, D, of array 120 of approximately 18.4 mm, and incoming and outgoing angles, β, and α, each equal to approximately 3.75 degrees. If incoming and outgoing angles, β and α, are each equal to approximately 3.75 degrees, each mirror travels approximately 16.4 μm when tilting clockwise and tilting counterclockwise.

Referring to FIGS. 5($a$) through 5($d$) cross sectional views of several embodiments of a curved reflective component are illustrated. Each of these realizations may be employed with a mirror array to extend the distance between a mirror array and the curved reflective component beyond the Rayleigh range without scattering an optical signal. These embodiments include a convex mirror in FIG. 5($a$), a planar mirror having a bi-convex lens for producing a converging reflected optical signal in FIG. 5($b$), a Mangin mirror FIG. 5($c$), and a compound Mangin mirror in FIG. 5($d$). For more information on lens and mirror design, generally, and Mangin mirrors particularly, see Smith "Modern Lens Design: A Resource Manual," McGraw-Hill 1992 (hereinafter "Smith"), hereby incorporated by reference. It should be apparent to one of ordinary skill that the examples illustrated in FIGS. 5($a$) through 5($d$) are merely illustrative and not exhaustive. When employed in an optical device for routing signals as detailed herein without scattering optical signals, each of the curved reflective components, depicted FIGS. 5($a$) through 5($d$), are spaced from a mirror array at a distance that corresponds with the radius of curvature of the particularly selected curved reflective component—the relationship between radius of curvature, R, Rayleigh range $Z_R$, and displacement distance, Z, is expressed in the mathematical equation detailed hereinabove.

Figure 6:
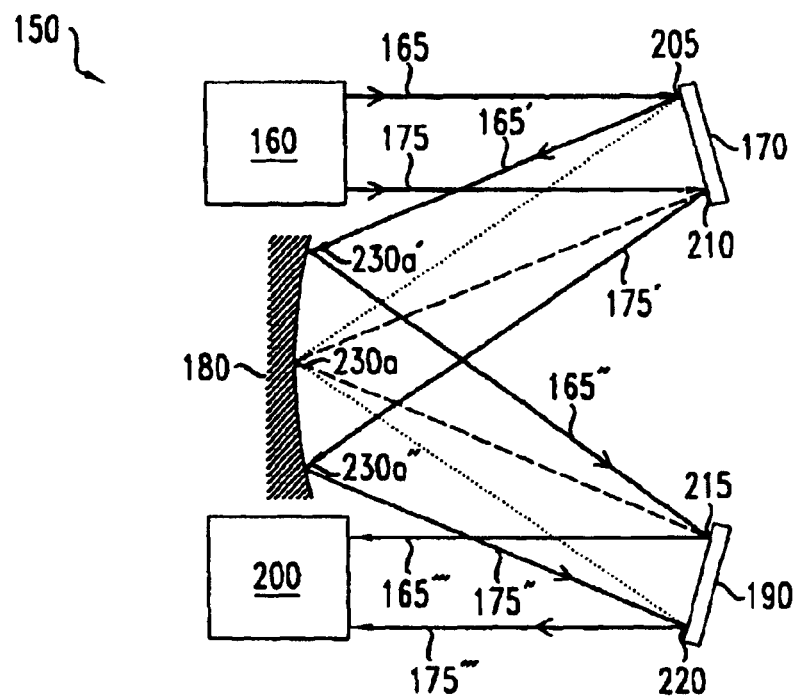
FIG. 6 is a cross-sectional view of a further embodiment of the present invention.

Referring to FIG. 6, a cross sectional view of an optical device 150 for routing optical signals is illustrated. Optical device 150 routes a plurality of optical signals from a first port 160 to a second port 200. First and second ports, 160 and 200, are not co-located in the present embodiment, unlike input/output port 110 of FIG. 4.

Optical switch 150 includes a first and a second mirror array, 170 and 190, in combination with a curved reflective component 180. Each mirror array has a matrix of reflective elements or mirrors. First and/or second mirror array, 170 and/or 190, may be realized by a MEMS based mirror array formed on a common substrate. Each of the mirrors of arrays, 170 and 190, may tilt in response to a control signal. Once the mirrors of the array 170 are positioned, one or more incoming optical signals from first port 160 might be directed by the law of reflection to a particular location(s) on curved reflective component 180.

Curved reflective component 180 has a concave shape. The curvature of component 180 enables an increase in the spacing between array 170 and reflective component 180, as well as the spacing between array 190 and reflective component 180, to the sum of the Rayleigh range, $Z_R$, and a displacement distance, Z, without scattering the optical energy being reflected between the mirrors of array 170 and reflective component 180, and between the mirrors of array 190 and reflective component 180. In one embodiment of the present invention, curved reflective component 180 is a spherically shaped mirror. Various alternatives, however, will become apparent to skilled artisans upon reviewing the present disclosure.

The following is a representation of the interaction between mirror array 170, curved reflective component 180, and mirror array 190 in routing a pair of incoming optical signals 165 and 175 from first port 160 to a second port 200. Upon receiving a control signal, a first and a second exemplary mirror, 205 and 210, each are positioned to receive and reflect incoming optical signals 165 and 175. First exemplary mirror 205 directs optical signal 165' onto curved reflective component 180, while second exemplary mirror 210 directs optical signal 175' onto curved reflective component 180. Optical signal 165' is directed by exemplary mirror 205 within a range of locations, 230a to 230a', on curved reflective component 180. Likewise, optical signal 175' is directed by exemplary mirror 210 within a range of locations, 230a to 230a", on curved reflective component 180. Curved reflective component 180 receives directed optical signal 165' from exemplary mirror 205 at an incident angle with respect to normal to a surface of curved reflective component 180. Optical signal 175' is received by curved reflective component 180 from exemplary mirror 210 at an incident angle with respect to normal to a surface of curved reflective component 180. Employing the law of reflection, optical signals 165" and 175" are each reflected off curved reflective component 180 at angles equal to their angles of incidence. In turn, optical signal 165" is directed towards a first location on second array 190, while optical signal 175" is directed towards a second location on second array 190. In the present example, location 230a' on curved reflective component 180 causes optical signal 165" to be directed towards a third exemplary mirror 215 on second array 190, while location 230a" on curved reflective component 180 causes optical signal 175" to be directed towards a fourth exemplary mirror 220 on second array 190. Third exemplary mirror 215 is positioned, in response to a control signal, to receive and reflect optical signal 165". Fourth exemplary mirror 220 is positioned, in response to a control signal, to receive and reflect optical signal 175". Upon receiving optical signals 165" and 175", third and fourth exemplary mirrors, 215 and 220, reflect optical signals 165'" and 175'". Thus, by positioning both third and fourth exemplary mirrors, 215 and 220, of array 190, optical switching device 150 routes incoming optical signals 165 and 175 from first port 160 to second port 160. It should be apparent to skilled artisans in view disclosure herein that a plurality of optical signals may be routed using a multitude of mirrors on mirror arrays 170 and 190 and curved reflective component 180.

Figure 7:
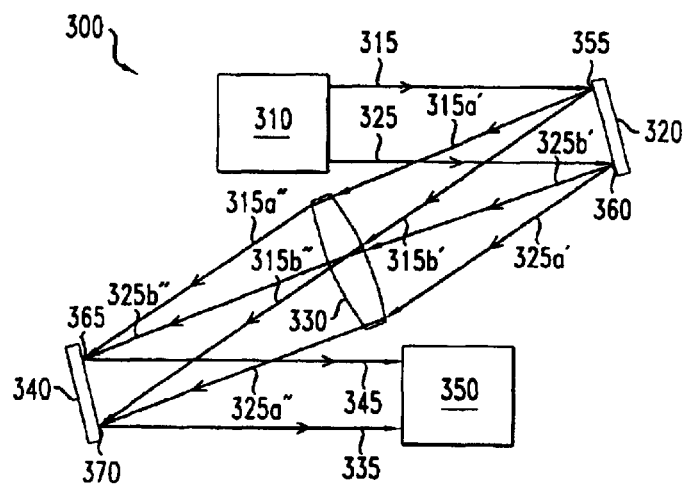
FIG. 7 is a cross-sectional view of a further embodiment of the present invention.

Referring to FIG. 7, a cross sectional view of an optical device 300 for routing optical signals is illustrated. Optical device 300 routes a plurality of optical signals from a first port 310 to a second port 350. In one embodiment of the present invention, optical signals are directed from first port 310 to second port 350. In alternative embodiment, a number of optical signals may be directed from a first portion of first port 310 to a first portion of second port 350, while other optical signals may be directed from a second portion of second port 350 to a second portion of second port 310, such that port 310 directs and receives optical signals from port 350 and port 350 directs and receives optical signals from port 310.

Optical switch 300 includes a first and a second mirror array, 320 and 340, in combination with an optical component 330. Each mirror array, 320 and 340, has a matrix of reflective elements or mirrors. First and/or second mirror array, 320 and/or 340, may be realized by a MEMS based mirror array. Optical component 330 is realized by a bi-convex optical lens. Various alternatives, however, will become apparent to skilled artisans upon reviewing the present disclosure. Each of the mirrors of arrays, 320 and 340, may tilt in response to a control signal. Once the mirrors of the array 320 are positioned, at least one incoming optical signal from first port 310 might be directed by the law of reflection to the array 340, through bi-convex optical lens 330, and thereafter second port 350.

Bi-convex optical lens 330 has converging properties. The converging properties enable an increase in the spacing between array 320 and optical lens 330, as well as the spacing between array 340 and optical lens 330, to the sum of the Rayleigh range, $Z_R$, and a displacement distance, Z. The increase in separation however does not scatter the optical energy being reflected between the mirrors of array 320 and optical lens 330, and between the mirrors of array 340 and optical lens 330.

The following is a representation of the interaction between first mirror array 320, bi-convex optical lens 330, and second mirror array 340 in routing a pair of incoming optical signals 315 and 325 from first port 310 to a second port 350. Upon receiving a control signal, a first and a second exemplary mirror, 355 and 360, each are positioned to receive and reflect incoming optical signals 315 and 325. First exemplary mirror 355 directs optical signal 315 within the range of 315a' and 315b' towards bi-convex optical lens 330 depending on the position of first exemplary mirror 355. Likewise, second exemplary mirror 360 directs optical signal 325 within the range of 325a' and 325b' towards bi-convex optical lens 330 depending on the position of second exemplary mirror 360.

Bi-convex optical lens 330 directs optical signals reflected from first and second exemplary mirrors, 355 and 360, towards second mirror array 340. With respect to first exemplary mirror 355, if optical signal 315 takes the 315a' path, lens 330 forms optical signal 315a". As a result, optical signal 315a" is directed by lens 330 towards a third exemplary mirror 365 on mirror array 340. Exemplary mirror 365 receives optical signal 315a" and forms a reflected optical signal 345 directed toward a first portion of port 350. In the alternative, if optical signal optical signal 315 takes the path 315b', lens 330 forms optical signal 315b", which is directed towards a fourth exemplary mirror 370 on mirror array 340. Exemplary mirror 370 receives optical signal 315b" and forms a reflected optical signal 335 directed toward a second portion of port 350. With respect to second exemplary mirrors 360, if optical signal 325 takes the 325a' path, lens 330 forms optical signal 325a". As a result, optical signal 325a" is directed by lens 330 towards fourth exemplary mirror 370. Exemplary mirror 370 receives optical signal 325a" and forms reflected signal 335 directed toward the second portion of port 350. Alternatively, lens 330 forms optical signal 325b" if the optical signal takes the path 325b'. Optical signal 325b" is directed towards third exemplary mirror 365. Exemplary mirror 365 receives optical signal 325b" and forms a reflected optical signal 345 directed toward the first portion of port 350. It should be apparent to skilled artisans in view disclosure herein that a plurality of optical signals may be routed using a multitude of mirrors on mirror arrays 320 and 340 and bi-convex lens component 330.

Figure 8A:
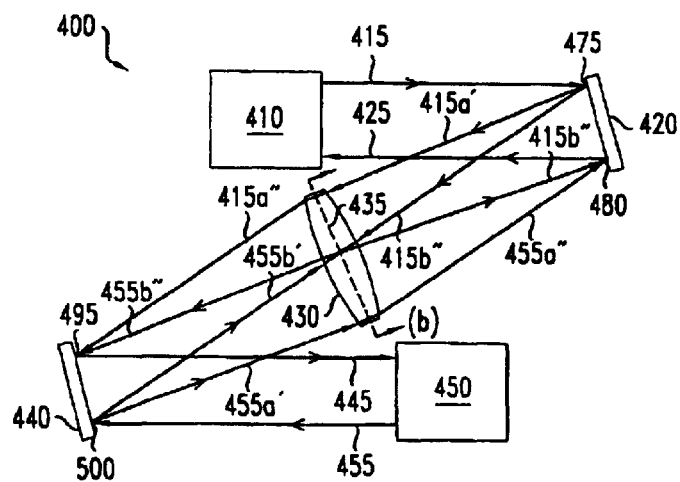
FIG. 8 (*a*) is a cross-sectional view of a further embodiment of the present invention, while FIG. 8(*b*) is a cross-sectional view of a component employed within the embodiment of FIG. 8(*a*).
Figure 8B:
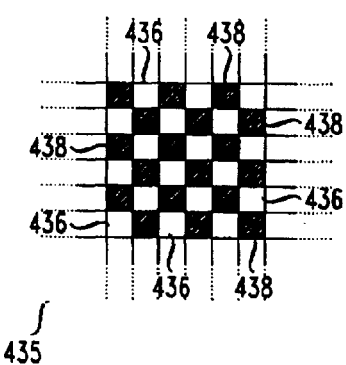

Referring to FIGS. 8(a) and 8(b), a cross sectional view of an optical switching device 400 for routing optical signals is illustrated. Optical device 400 routes a plurality of optical signals between a first and a second port, 410 and 450. More particularly, device 400 routes optical signals from a first portion of a first port 410 to a first portion of a second port 450, a second portion of second port 450 to a second portion of first port 410. Device 400 also routes optical signals from a third portion from first port 410 to a fourth portion of first port 410, and a third portion from second port 450 to a fourth portion of first port 450.

Optical switch 400 includes a first and a second mirror array, 420 and 440, in combination with an optical component 430. Each mirror array, 420 and 440, has a matrix of reflective elements or mirrors. First and/or second mirror array, 420 and/or 440, may be realized by a MEMS based mirror array. Optical component 430 includes a bi-convex optical lens having a two-sided patterned mirror 435 embedded therein. As illustrated in FIG. 8(b), patterned mirror 435 has a checkerboard configuration including non-reflective, lens portions 436 alternating with reflective, mirror portions 438. Reflective, mirror portions 438 are reflective on both sides such that an exemplary optical signal emanating from array 420 may be reflected back towards array 420, while an exemplary optical signal emanating from array 440 may be reflected back towards array 440. The dimensions of lens portions 436 and reflective, mirror portions 438, are advantageously at least equal to the dimensions of an optical beam as it approaches portions 436 or 438 of patterned mirror 435. In one embodiment, non-reflective, lens portions 436 and reflective, mirror portions 438 each have a dimension of 0.5 mm by 0.5 mm.

Bi-convex optical lens 430 has converging properties. The converging properties enable an increase in the spacing between array 420 and optical lens 430, as well as the spacing between array 440 and optical lens 430, to the sum of the Rayleigh range, $Z_R$, and a displacement distance, Z. The increase in separation however does not scatter the optical energy being reflected between the mirrors of array 420 and optical lens 430, and between the mirrors of array 440 and optical lens 430.

The following is a representation of the interaction between first mirror array 420, bi-convex optical lens 430, and second mirror array 440 in routing optical signals 415 and 455. It should be apparent to skilled artisans in view disclosure herein, however, that a plurality of optical signals may be routed using a multitude of mirrors on mirror arrays 420 and 440 and lens 430. Upon receiving a control signal, a first exemplary mirror 475 of mirror array 420 is positioned to receive and reflect optical signal 415. First exemplary mirror 475 directs optical signal 415 within a range of 415a' and 415b' towards bi-convex optical lens 430, depending on the position of first exemplary mirror 475. If optical signal 415 takes the 415a' path, optical signal 415a' passes through a non-reflective, lens portion 436 of bi-convex optical lens 430 to form optical signal 415a". As a result, optical signal 415a" is directed by lens 430 towards a second exemplary mirror 495 of array 440. Exemplary mirror 495 receives optical signal 415a" and, in response to a control signal, is positioned to form a reflected optical signal 445 directed towards a first portion of port 450. Alternatively, if optical signal 415 takes the 415b' path, optical signal 415b' is reflected off a mirror portion 438 of lens 430 to form optical signal 415b". As a result, optical signal 415b" is directed by the mirror portion 438 of lens 430 towards a third exemplary mirror 480 of array 420. Exemplary mirror 480 receives optical signal 415b" and, in response to a control signal, is positioned to form a reflected optical signal 425 directed towards a second portion of port 410.

Similarly, upon receiving a control signal, a fourth exemplary mirror 500 of mirror array 440 is positioned to receive and reflect optical signal 455. Exemplary mirror 500 directs optical signal 455 within a range of 455a' and 455b' towards bi-convex optical lens 430, depending on the position of first exemplary mirror 500. If optical signal 455 takes the 455a' path, optical signal 455a' passes through a non-reflective, lens portion 436 of bi-convex optical lens 430 to form optical signal 455a". As a result, optical signal 455a" is directed by lens 430 towards third exemplary mirror 480 of array 420. Exemplary mirror 480 receives optical signal 455a" and, in response to a control signal, is positioned to form a reflected optical signal 425 directed towards a second portion of port 410. Alternatively, if optical signal 455 takes the 455b' path, optical signal 455b' is reflected off a mirror portion 438 of lens 430 to form optical signal 455b". As a result, optical signal 455b" is directed by the mirror portion 438 of lens 430 towards second exemplary mirror 495 of array 440. Exemplary mirror 495 receives optical signal 455b" and, in response to a control signal, is positioned to form a reflected optical signal 445 directed towards a second portion of port 450.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Thus, while detailed the present invention applies to an optical switch for routing optical signals between an input and output port, it should be apparent to one of ordinary skill that the present invention may also be applied to any apparatus for beam steering electromagnetic energy, including, for example, liquid crystal devices. It is therefore contemplated that the appended claims will cover any such modifications or embodiments as fall within the true scope of the invention.

What is claimed is:

1. An optical switch, comprising:

at least one mirror array optically couplable to an optical signal; and an optical component having a curved surface and spaced from said at least one mirror array by a distance (Z) greater than a focal length ($Z_R$) of a reflected optical signal from said at least one mirror array.

2. The optical switch recited in claim 1, wherein said curved surface has a radius of curvature equal to about $Z+(Z_R^2/Z)$.

3. The optical switch recited in claim 1, wherein said optical component is a mirror.

4. The optical switch recited in claim 3, wherein said curved surface is concave.

5. The optical switch recited in claim 3, wherein said curved surface is convex.

6. The optical switch recited in claim 3, wherein said mirror is a Mangin mirror.

7. The optical switch recited in claim 3, wherein said mirror is a compound Mangin mirror.

8. The optical switch recited in claim 1, wherein said optical component is a planar mirror having a bi-convex lens.

9. The optical switch recited in claim 1, wherein said optical component is a bi-convex lens.

10. The optical switch recited in claim 9, wherein said bi-convex lens further includes a patterned mirror therein.

11. The optical switch recited in claim 1, wherein said optical component and said at least one mirror array are capable of cooperating to route said optical signal between a first port and a second port in response to a control signal to said at least one mirror array.

12. The optical switch recited in claim 11, wherein said at least one mirror array includes a plurality of reflective elements and at least one of said plurality of reflective elements is configured to redirect said optical signal in response to said control signal to facilitate said routing.

13. The optical switch recited in the claim 11, wherein said at least one mirror array includes a first MEMS mirror array optically coupled to a second MEMS mirror array with said optical component therebetween.

14. The optical switch recited in claim 11, wherein said first port and said second port are separately located input and output ports, respectively.

* * * * *